United States Patent [19]

Kojima

[11]  4,345,714
[45]  Aug. 24, 1982

[54] CONTROL METHOD AND APPARATUS FOR AIR CONDITIONERS

[75] Inventor: Yasuhumi Kojima, Gifu, Japan

[73] Assignee: Nippondenso Co., Ltd., Kariya, Japan

[21] Appl. No.: 173,894

[22] Filed: Jul. 28, 1980

[30] Foreign Application Priority Data

Aug. 1, 1979 [JP] Japan .................................. 54-98528

[51] Int. Cl.³ ............................................. G05D 23/00
[52] U.S. Cl. ................................ 236/46 R; 236/91 C; 165/12
[58] Field of Search ..................... 62/157, 231; 165/12; 236/46 R, 46 A, 46 F, 46 C, 91 R, 91 C

[56] References Cited

U.S. PATENT DOCUMENTS

| 4,172,555 | 10/1979 | Levine | 236/46 R |
| 4,266,599 | 5/1981 | Saunders et al. | 165/12 |
| 4,274,475 | 6/1981 | Rall et al. | 165/12 |

Primary Examiner—Albert J. Makay
Assistant Examiner—Harry B. Tanner
Attorney, Agent, or Firm—Cushman, Darby & Cushman

[57] ABSTRACT

In control of an air conditioner, a first deviation corresponding to the rate of change of the actual air temperature in a compartment is detected such that an expected value of the actual air temperature to be obtained as a stable value under the control of the air conditioner is detected to detect a second deviation in relation to a desired temperature. When the second deviation is larger than a predetermined value, a third deviation is also detected in relation to the second deviation to adjust the temperature of air flow supplied from the air conditioner and to eliminate undesired temperature deviation caused by fluctuation of the heat load in the compartment.

8 Claims, 5 Drawing Figures

CONTROL METHOD AND APPARATUS FOR AIR CONDITIONERS

BACKGROUND OF THE INVENTION

The present invention relates to a control method and apparatus for air conditioners, and more particularly, but not exclusively, to a control method and apparatus suitable for an automobile air conditioner wherein the temperature of air flow is automatically controlled in accordance with change of the heat load in the passenger compartment of an automobile.

As shown in FIG. 1, a conventional control system for an air conditioner comprises a set circuit 1 for producing an output signal indicative of a desired temperature $T_{set}$ of air in a compartment or region to be conditioned, a temperature sensor 2 for producing an output signal indicative of the actual temperature $T_r$ of air in the compartment, and a detector 3 responsive to the output signals from set circuit 1 and sensor 2 for detecting any deviation between the desired temperature $T_{set}$ and the actual temperature $T_r$ and for producing an output signal indicative of the detected deviation. A temperature controller 4 receives the output signal from detector 3 to control the temperature of air flow in accordance with the deviation so as to adjust the actual temperature $T_r$ to the desired temperature $T_{set}$ and maintain it at the same.

During operation of temperature controller 4, the sensor 2 acts to produce a feedback signal indicative of any change of the actual temperature in the compartment, and the controller 4 acts to adjust the actual temperature $T_r$ to the desired temperature $T_{set}$ in response to the feedback signal from sensor 2. In this instance, the heat load in the compartment fluctuates in accordance with variations of the outside ambient temperature $T_{am}$, and subsequently the actual temperature $T_r$ fluctuates due to delay of heat transfer in the compartment. To restrain fluctuation of the actual temperature in the compartment, an outside ambient temperature sensor 6 and an adder 7 are provided to preliminarily compensate the fluctuation of head load caused by a change of the outside ambient temperature $T_{am}$.

In the control system described above, assuming that the quantity of air flow is at a constant value, the temperature of air flow is adjusted by controller 4 as represented by the following equation.

$$T_{ao} = K_{ser}T_{set} - K_{am} \cdot T_{am} - K_r T_r + C$$

where $T_{set}$ is the desired temperature in the compartment, $T_{am}$ is the outside ambient temperature, $T_r$ is the actual temperature in the compartment, C is a constant, and $K_{set}$, $K_{am}$ and $K_r$ are respectively gains of set circuit 1 and sensors 6 and 2, which are preliminarily determined to adjust the actual temperature $T_r$ toward the desired temperature $T_{set}$ without any influence caused by changes of the outside ambient temperature. In controlling the air conditioner, although the outside ambient temperature is measured to compensate the temperature of air flow in accordance with fluctuation of the heat load in the compartment, it is disregarded to compensate the temperature of air flow in relation to another fluctuation of the heat load caused by the intensity and direction of sunshine entering the compartment, change of the vehicle speed and the number of passengers and the like, since the constant C is experimentarily determined in a fixed value. This results in any deviation between the actual temperature and the desired temperature due to the disregarded fluctuation of the heat load.

SUMMARY OF THE INVENTION

It is, therefore, the primary object of the present invention to provide an improved method and apparatus of controlling an air conditioner in which the rate of change of the actual air temperature in the compartment to be conditioned is detected at a predetermined time interval after lapse of a predetermined period of time from starting the air conditioner to preliminarily measure an expected value of the actual air temperature to be obtained as a stable value under control of the air conditioner, and in which the quantity of heat supplied by the air conditioner is compensated in accordance with a deviation between a desired air temperature and the expected value of the actual air temperature to eliminate undesired temperature deviation caused by the disregarded fluctuation of the heat load in the compartment.

According to an aspect, the present invention is directed to improve a method of controlling an air conditioner which supplies an air flow into a compartment or other region, the air conditioner comprising an air flow quantity control device and an air flow temperature control device, the method comprising the steps of detecting the quantity of heat necessary for adjusting the actual temperature of air in the compartment or other region to a desired value and to maintain it at the desired value, and controlling the air flow temperature control device in such manner that the air flow temperature is such as to enable the air flow at a desired air flow quantity to supply the necessary heat quantity, the necessary heat quantity and the air flow temperature being determined employing electric signals in the form of a first electric signal indicative of the actual air temperature in the compartment or other region and a second electric signal indicative of a desired air temperature in the compartment or other region.

The improvement of the method comprises the steps of;

detecting a first deviation between values of the preceding and following first electric signals at a predetermined time interval after lapse of a predetermined period of time from starting the air conditioner;

detecting an expected value of the actual air temperature in relation to the first deviation, the expected value of the actual air temperature being obtained as a stable value under the control of the air flow temperature control device;

detecting a second deviation between the desired value and the expected value of the actual air temperature;

detecting a third deviation related to the second deviation when the second deviation is larger than a predetermined value; and compensating the necessary heat quantity in accordance with the third deviation.

According to another aspect, the present invention is directed to improve an air conditioner control apparatus for use with an air conditioner which is arranged to supply an air flow into a compartment or other region, such air conditioner comprising an air flow quantity control device and an air flow temperature control device, the air conditioner control apparatus being operable to control the quantity of heat, supplied by the air conditioner, to be a quantity necessary for adjusting the actual temperature of air in the compartment or other region to a desired value and to maintain it as the desired value, the air conditioner control apparatus being operable to control the air flow temperature control device in such manner that the air flow temperature will be such as to enable the air flow having a desired air flow quantity to supply the necessary heat quantity, the necessary heat quantity and the air flow temperature being determined employing electric signals in the form of a first electric signal indicative of the actual air temperature in the compartment or other region, and a second electric signal indicative of a desired air temperature in the compartment or other region.

The improvement of the present invention is characterized in that the air conditioner control apparatus is operable to detect a first deviation between values of the preceding and following first electric signals at a predetermined time interval after lapse of a predetermined period of time from starting the air conditioner and to detect an expected value of the actual air temperature in relation to the first deviation, the expected value of the actual air temperature being obtained as a stable value under the control of the air flow temperature control device, and that the air conditioner control apparatus is operable to detect a second deviation between the desired value and the expected value of the actual air temperature so as to detect a third deviation related to the second deviation when the second deviation is larger than a predetermined value thereby to compensate the necessary heat quantity in accordance with the third deviation.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
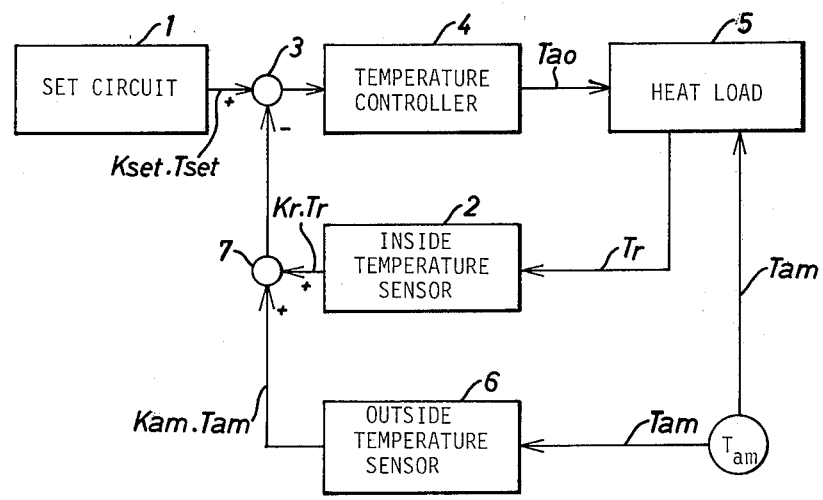
FIG. 1 is a functional block diagram of a conventional air conditioner control system.
Figure 2:
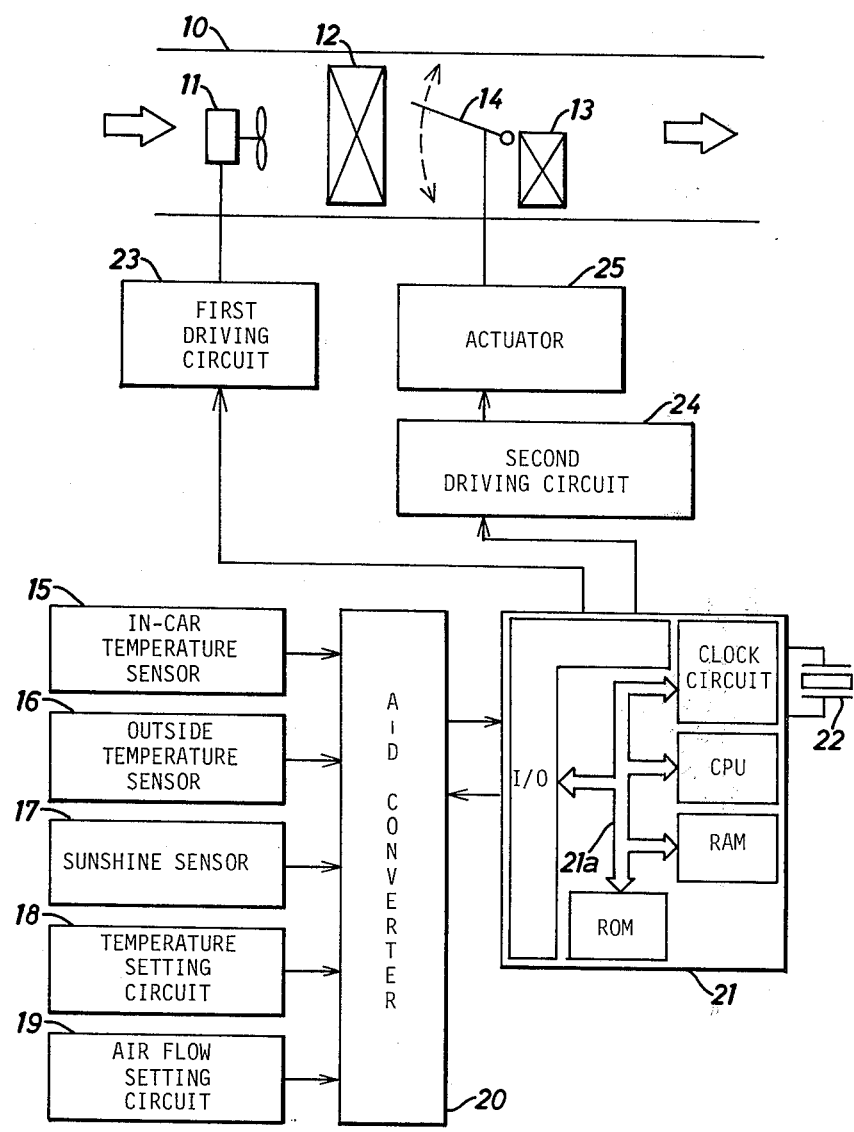
FIG. 2 is a schematic block diagram of an air conditioner control apparatus in accordance with the present invention adapted to an automobile air conditioner.

Referring now to FIG. 2 of the drawings, there is schematically illustrated a preferred embodiment of the present invention in which a microcomputer 21 is utilized to execute a predetermined computer program for air conditioning in the passenger compartment of a vehicle. The reference numeral 10 indicates an air duct of a conventional automobile air conditioner which is provided therein with a blower 11, a cooler-core 12, and a heater-core 13. The air duct 10 is located at the front portion of the passenger compartment. An air-blend door 14 is arranged in a conventional manner to adjust the proportion of the cooled air from cooler-core 12 and the warmed air from heater-core 13 flowing into the passenger compartment, as shown by an arrow in the figure. The microcomputer 21 is connected through an analog-to-digital or A-D converter 20 to an in-car temperature sensor 15, an outside ambient temperature sensor 16, a sunshine sensor 17, a temperature setting circuit 18, and an air flow setting circuit 19.

The in-car temperature sensor 15 is located in the shade of the passenger compartment under an instrument panel of the vehicle to detect actual average in-car temperature in the compartment and to produce an electric signal indicative of the actual in-car temperature $T_{r'}$. The outside ambient temperature sensor 16 is located outside the passenger compartment to detect actual outside ambient temperature and to produce an electric signal indicative of the actual outside temperature $T_{am'}$. The sunshine sensor 17 is located inside the passenger compartment to detect intensity of sunshine and to produce an electric signal indicative of the intensity of sunshine $T_{s'}$. The temperature setting circuit 18 includes a variable resistor which is manually adjusted to produce an electric signal indicative of a desired in-car temperature $T_{set'}$. The air flow setting circuit 19 is provided to produce an electric signal indicative of a desired quantity of air flow W. A-D converter 20 acts to convert the electric signals from sensors 15 to 19 into electric binary signals respectively.

The microcomputer 21 is in the form of a single chip LSI microcomputer which receives a constant voltage from a voltage stabilizer (not shown) in its operation. The voltage stabilizer is supplied with electric power from a vehicle battery (not shown) upon closing an ignition switch (not shown) to produce the constant voltage therefrom. The microcomputer 21 comprises a central processing unit or CPU which is connected to an input-output device or I/O through a bus line 21a. CPU is also connected through bus line 21a to a clock circuit, a read only memory or ROM and a random access memory or RAM. I/O receives the electric binary signals from A-D converter 20 to store them in RAM temporarily. These stored signals are selectively read out from RAM and applied to CPU through bus line 21a. CPU serves to execute the predetermined computer program in accordance with clock signals from the clock circuit. The clock circuit is cooperable with a crystal oscillator 22 to produce the clock signals at a predetermined frequency. The predetermined computer program is stored in ROM such that the computer 21 calculates the quantity of heat necessary for controlling the in-car temperature at a desired level and calculates the temperature of air flow $T_{ao}$ necessary for discharging the calculated quantity of heat by a predetermined quantity of air flow W into the passenger compartment, as described in detail later.

A first driving circuit 23 has an input terminal connected to a first output terminal of computer 21 and an output terminal connected to an input terminal of blower 11. The first driving circuit 23 acts to conduct a chopper control of blower 11 in response to an output signal indicative of a predetermined quantity of air flow from computer 21 under control of the air flow setting circuit 19. Thus, the blower 11 is driven to supply the predetermined quantity of air flow into the passenger compartment in accordance with setting of the air flow setting circuit 19. An electrically operated actuator 25 is in the form of an electric motor or an electromagnetically operated servomotor which is linked with air-blend door 14 to control the angular position of blend door 14 in response to an output signal from a second driving circuit 24. The second driving circuit 24 has an input terminal connected to a second output terminal of computer 21 and an output terminal connected to an input terminal of actuator 25. The second driving circuit 24 acts to control electric power supply to actuator 25 in response to an output signal indicative of the calculated temperature of air flow from computer 21. Thus, the angular position of air-blend door 14 is adjusted by operation of the actuator 25 to maintain the temperature of air flow discharged from the air conditioner in the calculated resultant value. In addition, the second driving circuit includes a position sensor (not shown) which is provided to detect the angular position of air-blend door 14 for detecting the actual temperature of air flow from the air conditioner.

Figure 3:
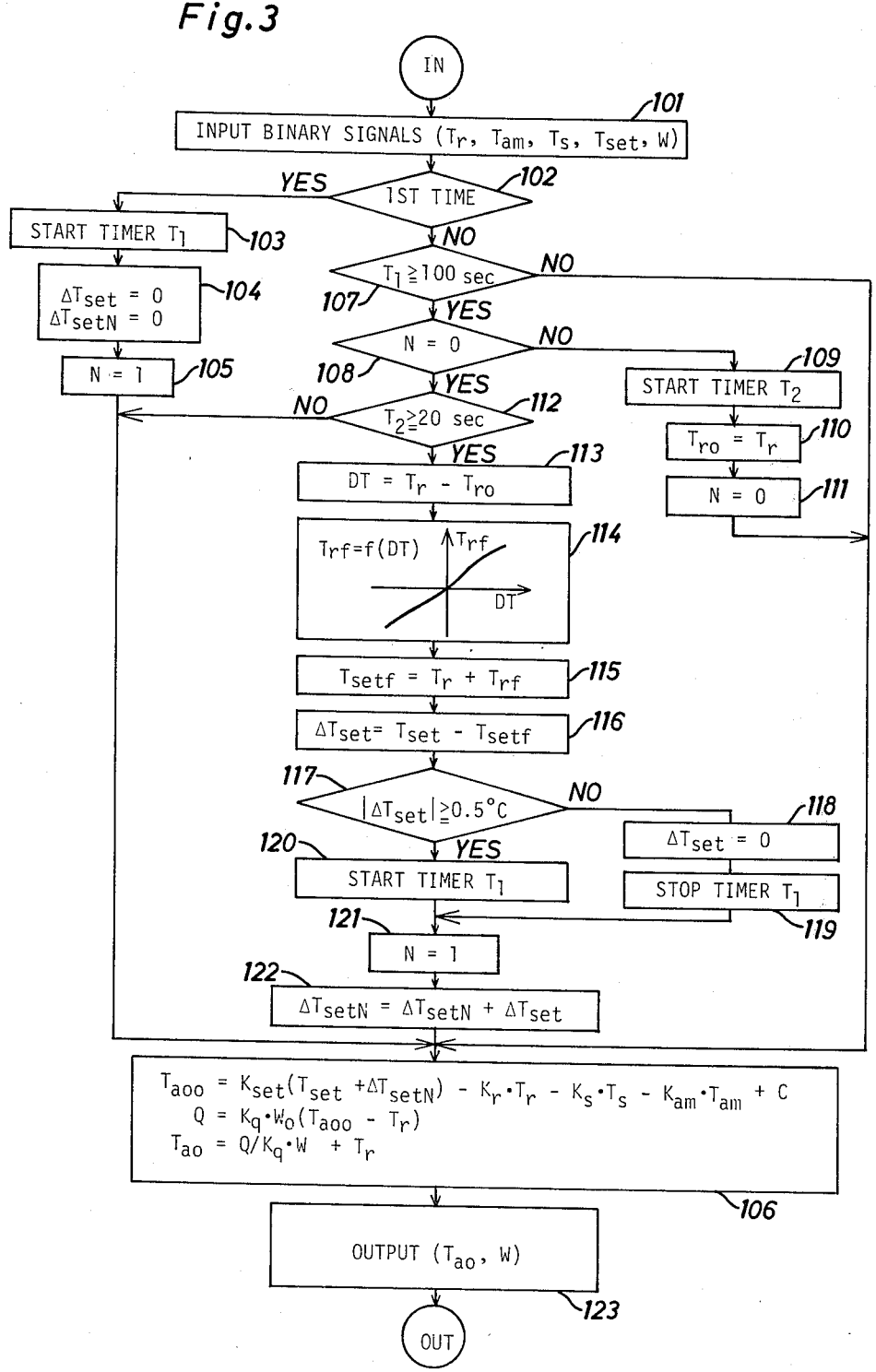
FIG. 3 is a flow diagram illustrating operation of the microcomputer shown in block form in FIG. 2.

Hereinafter, operational modes of the above control system will be described in detail with reference to a flow chart shown in FIG. 3. When the voltage stabilizer is energized by closing the ignition switch to produce a constant voltage therefrom, the microcomputer 21 is conditioned in its operation to initiate execution of the following calculations according to the predetermined program at a frequency of approximately several milliseconds. Simultaneously, electric signals from sensors 15, 16 and 17 and setting circuits 18 and 19 are converted by A-D converter 20 into binary signals respectively indicative of actual in-car temperature $T_r$, outside ambient temperature $T_{am}$, intensity of sunshine $T_s$, a desired in-car temperature $T_{set}$ and a desired quantity of air flow W. When the computer program proceeds to a point 101, the binary signals from A-D converter 20 are memorized in RAM of computer 21. At a point 102, CPU of computer 21 proceeds the program to a point 106 through a routine including points 103, 104 and 105 at the first stage immediately after the initiation of calculation. Then, CPU of computer 21 acts at point 103 to start a first timer $T_1$ associated therewith, and acts respectively at points 104 and 105 to set $\Delta T_{set}=0$, $\Delta T_{setN}=0$ and $N=1$, where $\Delta T_{set}$ is a deviation between a desired value and an expected value of the actual in-car temperature to be obtained as a stable value under control of the air conditioner, $\Delta T_{setN}$ is a previously calculated deviation of $\Delta T_{set}$, and N is a flag.

At point 106, CPU of computer 21 calculates a quantity of heat Q to be supplied into the passenger compartment, which may correspond with change of the heat load in the compartment. For instance, assuming that the quantity of air flow W is at a value $W_o$, a temperature of air flow $T_{aoo}$ is calculated from the following equation.

$$T_{aoo}=K_{set}(T_{set}+\Delta T_{setN})-K_r T_r-K_s T_s-K_{am}T_{am}+C \qquad (1)$$

where $T_{set}$ is the desired in-car temperature, $T_{am}$ is the outside ambient temperature, $T_r$ is the actual in-car temperature, C is a constant, and $K_{set}$, $K_{am}$ and $K_r$ are respectively gains of set circuit 18 and sensors 16, 15. Based on the above calculation, the quantity of heat Q is calculated by CPU of computer 21 from the following equation.

$$Q=K_q W_o(T_{aoo}-T_r) \qquad (2)$$

where $K_q$ is a constant determined by the physical property of air. Then, CPU of computer 21 calculates a temperature of air flow $T_{ao}$ necessary for discharging the calculated quantity of heat Q at a predetermined quantity of air flow W. The calculation of temperature $T_{ao}$ is executed by CPU of computer 21 based on the following equation.

$$T_{ao}=Q/(K_q \cdot W)+T_r \qquad (3)$$

At point 123, CPU of computer 21 produces output signals respectively indicative of the predetermined quantity of air flow W and the calculated temperature $T_{ao}$ of air flow, each of which is applied to the first and second driving circuits 23 and 24.

When the computer program is returned to point 102 after the first calculation, as described above, the program proceeds to point 107 where CPU of computer 21 discriminates as to whether or not one hundred seconds lapse from the start of timer $T_1$. If an answer is "no", CPU proceeds the computer program to point 106 to calculate a temperature of air flow $T_{ao}$ as same as the first calculation. Subsequently, at point 123 CPU of computer 21 produces output signals respectively indicative of the predetermined quantity of air flow W and the calculated temperature of air flow $T_{ao}$, as previously described. If the answer at point 107 is "yes", CPU of computer 21 proceeds the program to a point 108 to discriminate whether or not the flag is zero. In this instance, CPU of computer 21 discriminates as "yes" because the flag is preliminarily set as $N=0$ at point 105, and it proceeds the program to a point 109 to start a second timer $T_2$ associated with CPU. Subsequently, a reference in-car temperature $T_{ro}$ is set at a point 110 as the actual in-car temperature $T_r$ newly read out from RAM, and at point 111 the flag is set as $N=0$. The flag N is used to execute a routine including points 113 to 122 at a time interval of twenty seconds, as described in detail later.

When the computer program is returned to point 108 through points 106, 123, 101, 102 and 107, CPU of computer 21 discriminates as "yes" because the flag N is previously set as zero at point 111, and it proceeds the program to a point 112 to discriminates as to whether or not twenty seconds lapse after the start of second timer $T_2$. If an answer is "no" at point 112, CPU of computer 21 proceeds the program to perform the calculations at point 106, as described above. If the answer is "yes" at point 112, CPU of computer 21 proceeds the program to the routine including points 113 to 122. In this routine, CPU of computer 21 acts to detect a first deviation between the reference in-car temperature $T_{ro}$ and the actual in-car temperature $T_r$ at the time interval of twenty seconds so as to detect an expected value of the actual in-car temperature in relation to the first deviation to be obtained as a stable value under the control of the air conditioner, and CPU of computer 21 further acts to detect a second deviation between the desired in-car temperature and the expected value of the actual in-car temperature so as to detect a third deviation related to the second deviation when the second deviation is equal to or larger than 0.5° C., thereby compensating the necessary heat quantity in accordance with the third deviation, as described in detail hereinafter.

At point 113, CPU of computer 21 calculates a deviation DT between the reference in-car temperature $T_{ro}$ and the actual in-car temperature $T_r$ based on an equation of $DT=T_r-T_{ro}$ to detect the rate of change of the actual in-car temperature under control of the air conditioner. At point 114, CPU of computer 21 calculates an expected deviation in relation to the calculated deviation DT based on a function of $T_{rf}=f(DT)$. In this case, the function of $T_{rf}=f(DT)$ is experimentally obtainable taking into consideration capability of the air conditioner, capacity of the passenger compartment and the like. In addition, the function of $T_{rf}=f(DT)$ may be replaced with an appropriate linear function in the form of $T_{rf}=a \cdot DT$ where a is a constant. Subsequently, the program proceeds to point 115 where CPU of computer 21 calculates the sum of the expected deviation $T_{rf}$ and the actual in-car temperature $T_r$ based on an equation of $T_{setf}=T_r+T_{rf}$ thereby to detect an expected value of the actual in-car temperature $T_r$ to be obtained as a stable value under the control of the air conditioner.

At point 116, CPU of computer 21 calculates a deviation $\Delta T_{set}$ between the desired in-car temperature $T_{set}$ and the expected value $T_{setf}$ of the actual in-car temperature based on an equation of $\Delta T_{set}=T_{set}-T_{setf}$. Subsequently, the program proceeds to point 117 where CPU of computer 21 discriminates as to whether or not an absolute value of the calculated deviation $\Delta T_{set}$ is equal to or larger than 0.5° C. If answer is "no", CPU of computer 21 proceeds the program to point 118 to set the deviation $\Delta T_{set}$ as null, and it acts to halt operation of first timer $T_1$ at point 119. This means that the first timer $T_1$ is stopped upon lapse of two minutes from its starting operation.

When the program proceeds to point 121, CPU of computer 21 acts to set the flag as $N=1$ to repetitively perform the discrimination at point 117 at a time interval of twenty seconds, as previously described. If the answer is "yes", the program proceeds to point 120 where CPU of computer 21 acts to restart the first timer $T_1$ from its zero second. Subsequently, CPU of computer 21 acts at point 121 to set the flag as $N=1$ and at point 122 to calculate a deviation $\Delta T_{setN}$ based on the following equation.

$$\Delta T_{setN}=\Delta T_{setN}+\Delta T_{set}$$

where $\Delta T_{setN}$ is a previously calculated value and $\Delta T_{set}$ is a successively calculated value.

Upon completion of the calculation at point 122, the calculated deviation $\Delta T_{setN}$ is entered into the calculation of the above-noted equation (1) to compensate the value of heat quantity calculated at point 106. As a result, the temperature $T_{ao}$ of air flow is compensated in accordance with the calculated deviation $\Delta T_{setN}$ to reliably direct the actual in-car temperature $T_r$ toward the desired value $T_{set}$. Sequentially, CPU of computer 21 returns the program to point 101 through point 123 to halt the calculation at points 113 to 122 within two minutes after start of the first timer $T_1$ at point 120.

Figure 4:
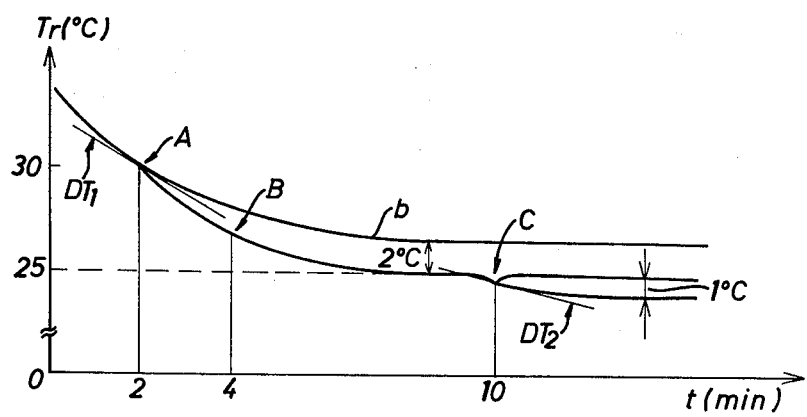
FIG. 4 is a graph illustrating the rate of change of the actual temperature of air in the compartment under control of the air conditioner.
Figure 5:
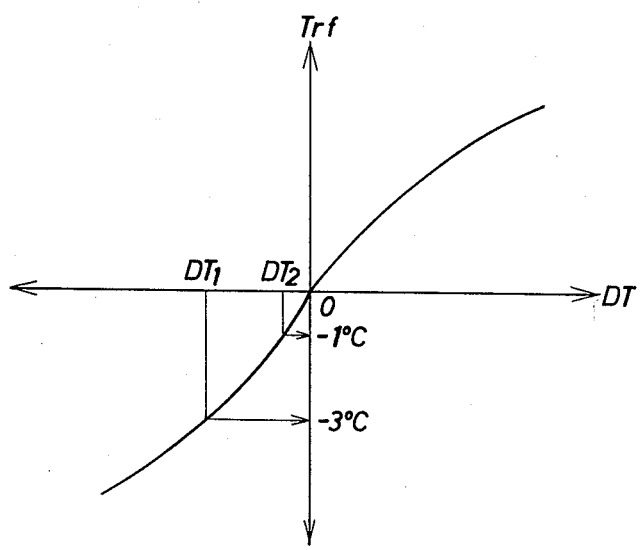
FIG. 5 is a graph illustrating an expected deviation related to the rate of change of the actual temperature of air.

In FIG. 4, there is illustrated the actual in-car temperature $T_r$ in relation to lapse of time t during operation of the air conditioner control apparatus. Assuming that CPU of computer 21 initiates execution of the computer program to adjust the actual in-car temperature to a desired temperature $T_{set}$ of 25° C. in summer, control of the actual in-car temperature in the compartment is continued without execution at points 120, 122 within two minutes after start of the program, as shown at points 101 to 112 of FIG. 3. If the actual in-car temperature $T_r$ is stabilized by 2° C. higher than the desired temperature $T_{set}$ under control of the air conditioner, as shown by a curve b in FIG. 4, a deviation $DT_1$ will be calculated at point 113 after lapse of two minutes, as shown at a timing A in FIG. 4. Then, at point 114 a deviation $T_{rf}$ will be calculated as $-3°$ C. in relation to the calculated deviation $DT_1$, as shown in FIG. 5. If the actual in-car temperature $T_r$ is 30° C. at the timing A of FIG. 4, a value of $T_{setf}$ will be calculated as 27° C. at point 115 in relation to the calculated deviation $T_{rf}$. At point 116, a deviation $\Delta T_{set}$ will be obtained as $-2°$ C. in relation to the desired value $T_{set}$ and the calculated value $T_{setf}$.

When CPU of computer 21 discriminates at point 117 that an absolute value of the deviation $\Delta T_{set}=-2°$ C. exceeds 0.5° C., the first timer $T_1$ is restarted at point 120, and a deviation $\Delta T_{setN}$ is calculated at point 122 as $-2°$ C. in relation to the initial value $\Delta T_{setN}=0$ and the deviation $\Delta T_{set}=-2°$ C. Thus, a necessary heat quantity is calculated in relation to the deviation $\Delta T_{setN}=-2°$ C. to direct the actual in-car temperature $T_r$ toward the desired temperature of 25° C. In addition, until lapse of two minutes defined by timings A and B in FIG. 4, a necessary heat quantity is repetitively calculated in relation to the deviation $\Delta T_{setN}=-2°$ C., as previously described, to direct the actual in-car temperature toward the desired temperature of 25° C.

Upon lapse of two minutes defined by the timings A, B of FIG. 4, CPU of computer 21 calculates a deviation $\Delta T_{set}$ at point 116 to discriminate whether or not an absolute value of the deviation $\Delta T_{set}$ is equal to or larger than 0.5° C., as previously described. If an answer is "no" at point 117 because of no change of the heat load in the compartment, CPU of computer 21 acts to set the deviation $\Delta T_{set}$ as zero at point 118 to halt operation of the first timer $T_1$ at point 119. Thereafter, the computer program is returned to point 102 through points 121, 106, and 123 to discriminate at a time interval of twenty minutes as to whether or not execution at points 113 to 117 should be performed.

Assuming that the number of passengers is decreased upon lapse of ten minutes defined by a timing C in FIG. 4 and that the actual in-car temperature is stabilized at an expected value of 24° C., the computer program proceeds to point 113 to calculate a deviation $DT_2$ from the equation of $DT=T_r-T_{ro}$, as previously described. Then, CPU of computer 21 calculates a deviation $T_{rf}$ as $-1°$ C. at point 114 in relation to the deviation $DT_2$, as shown in FIG. 5, and also calculates a value $T_{setf}$ as 24° C. in relation to the deviation $T_{rf}$ of $-1°$ C. and the desired temperature $T_{set}$ of 25° C. When a deviation $\Delta T_{set}$ is calculated as 1° C. at point 116 in relation to the desired and calculated values $T_{set}$ of 25° C. and $T_{setf}$ of 24° C., CPU of computer 21 discriminates as "yes" at point 117 to restart the timer $T_1$ at point 120. Then, CPU of computer 21 calculates a deviation $\Delta T_{setN}$ at point 122 in relation to the previously calculated value $\Delta T_{setN}$ and the deviation $\Delta T_{set}$ of 1° C. Thereafter, CPU also calculates a necessary heat quantity in relation to the calculated deviation $\Delta T_{setN}$ at point 106 to adjust the actual in-car temperature from 24° C. toward 25° C. As a result, the actual in-car temperature is smoothly adjusted by the air conditioner control apparatus within a predetermined range between ($T_{set}+0.5°$ C.) and ($T_{set}-0.5°$ C.). Additionally, each time interval defined by timers $T_1$, $T_2$ may be modified in accordance with capability of the air conditioner to effectively prevent the computer from its hunting operation to be caused by various disturbances.

In the actual practices of the present invention, the above air conditioner control apparatus may be modified to eliminate both of the ambient and sunshine sensors 16, 17. Thus, the modified control apparatus becomes simple in construction and low in production cost. The modified control apparatus also ensures substantially the same precise control as that of the above embodiment. In this modification, the actual in-car temperature may be adjusted in combination of each control of the air blend door 14 and blower 11.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. A method of controlling an air conditioner which supplies an air flow into a compartment or other region, the air conditioner comprising air flow quantity control means and air flow temperature control means, the method comprising the steps of detecting the quantity of heat necessary for adjusting the actual temperature of air in said compartment or other region to a desired value and to maintain it at said desired value, and controlling said air flow temperature control means in such manner that the air flow temperature is such as to enable the air flow at a desired air flow quantity to supply said necessary heat quantity, said necessary heat quantity and said air flow temperature being determined employing electric signals in the form of a first electric signal indicative of the actual air temperature in said compartment or other region and a second electric signal indicative of a desired air temperature in said compartment or other region, wherein the improvement comprises the steps of:

detecting a first deviation between values of the preceding and following first electric signals at a predetermined time interval after lapse of a predetermined period of time from starting the air conditioner;

detecting an expected value of the actual air temperature in relation to said first deviation, said expected value of the actual air temperature being obtained as a stable value under the control of said air flow temperature control means;

detecting a second deviation between said desired value and said expected value of the actual air temperature;

detecting a third deviation related to said second deviation when said second deviation is larger than a predetermined value; and compensating said necessary heat quantity in accordance with said third deviation.

2. A method of controlling an air conditioner as claimed in claim 1, and comprising the step of halting the detection of said first, second and third deviations during a predetermined period of time after compensation of said necessary heat quantity.

3. A method of controlling an air conditioner as claimed in claim 1 or 2, wherein said first deviation is detected in response to the preceding and following first electric signals at a time interval of twenty seconds after lapse of two minutes from starting the air conditioner.

4. A method of controlling an air conditioner as claimed in claim 1 or 2, wherein the step of detecting an expected value of the actual air temperature comprises the steps of:

calculating an expected deviation related to said first deviation based on a function defining a relationship between said first deviation and said expected deviation; and calculating the sum of the actual air temperature and said expected deviation.

5. A method of controlling an air conditioner as claimed in claim 1 or 2, wherein the step of detecting an expected value of the actual air temperature comprises the steps of:

calculating an expected deviation related to said first deviation based on a linear function defining a relationship between said first deviation and said expected deviation; and calculating the sum of the actual air temperature and said expected deviation.

6. A method of controlling an air conditioner as claimed in claim 1 or 2, wherein said third deviation is detected in relation to said second deviation when said second deviation is larger than 0.5° C.

7. In an air conditioner control apparatus for use with an air conditioner which is arranged to supply an air flow into a compartment or other region, such air conditioner comprising air flow quantity control means and air flow temperature control means, the air conditioner control apparatus being operable to control the quantity of heat, supplied by the air conditioner, to be a quantity necessary for adjusting the actual temperature of air in said compartment or other region to a desired value and to maintain it at said desired value, the air conditioner control apparatus being operable to control said air flow temperature control means in such manner that the air flow temperature will be such as to enable the air flow having a desired air flow quantity to supply said necessary heat quantity, said necessary heat quantity and said air flow temperature being determined employing electric signals in the form of a first electric signal indicative of the actual air temperature in said compartment or other region, and a second electric signal indicative of a desired air temperature in said compartment or other region, the improvement wherein the air conditioner control apparatus includes means for detecting, a first deviation between values of the preceding and following first electric signals at a predetermined time interval after lapse of a predetermined period of time from starting the air conditioner, and for detecting an expected value of the actual air temperature in relation to said first deviation, said expected value of the actual air temperature being obtained as a stable value under the control of said air flow temperature control means, and means for detecting a second deviation between said desired value and said expected value of the actual air temperature, for detecting a third deviation related to said second deviation when said second deviation is larger than a predetermined value, and for compensating said necessary heat quantity in accordance with said third deviation.

8. An air conditioner control apparatus as claimed in claim 7, and comprising a digital computer to control as aforesaid said air flow temperature control means in dependence upon said determined values which are calculated by the computer in accordance with its programming.

* * * * *